Oct. 13, 1959  G. HIRSCH  2,908,831
SPIT DRIVE UNITS
Filed Sept. 2, 1958

INVENTOR
GEORGE HIRSCH

BY *Paul S. Martin*

ATTORNEY

United States Patent Office 2,908,831
Patented Oct. 13, 1959

2,908,831

SPIT DRIVE UNITS

George Hirsch, River Edge, N.J., assignor to Brevel Products Corp., New York, N.Y., a corporation of New York Application September 2, 1958, Serial No. 758,190

9 Claims. (Cl. 310—68)

The present invention relates to spit drive units, such as are used in broilers.

A broiler spit is commonly operated by a drive unit including an electric motor coupled through reduction gearing to a spindle that has a polygonal socket for a spit of corresponding cross-section. An object of the present invention is to provide a new and improved spit driving unit, and to provide a novel form of driving spindle in such a unit, both for improved operation, improved strength, and to facilitate manufacture of the unit.

Spit drive units are often used in an oven having a broiler burner; and in such installations it is important for the wiring to the electric motor to be held to a minimum and for the entire apparatus including the drive unit and its control switch to be self-contained, suitable for mounting at the rear of the oven, behind its relatively thick heat-insulating back wall. The switch is arranged to control the motor automatically upon insertion of a spit. A further object of the present invention is to provide a novel simplified and reliable spit drive unit including an automatically actuated motor-control switch.

In the illustrative embodiment of the invention described in detail below, a spindle or rotor for driving the spit is provided with a passage that is square or hexagonal, or of other polygonal cross-section corresponding to the cross-section of the spit. This passage extends through the plane of a frame plate in which the spindle has its bearing support. This is advantageous over previous arrangements in that the weight of the spit is transmitted to the supporting frame without developing a bending stress in the spindle, in a fashion that imposes a minimum of stress on the apparatus.

The illustrative drive unit utilizes a spindle that carries a drive gear and is formed of three parts: a shaft, the gear and a spit-receiving rotor. The shaft is pressed-fitted into the gear and the rotor. The spindle is supported by two parallel frame plates. The rotor has an enlarged shouldered portion which resists thrust in the direction of one of the frame plates. At the opposite end of the spindle, the shaft has a thrust and supporting bearing in the other frame plate.

This arrangement is a distinct improvement over a prior drive unit construction in which the spit-supporting passage is formed in an enlarged element fastened to a part of the drive spindle shaft that projects outside the frame plates. The drive element is required to be fastened to the shaft after the entire assembly is made. In the present construction, the assembly of the novel spindle-receiving rotor, the drive gear and the shaft are united in a single operation, before the drive unit is to be assembled. After assembly of the drive unit, unlike the previous practice, no further operation of assembling the split-receiving fitting to the spindle drive shaft is required.

The illustrative embodiment involves an improved arrangement for supporting and operating the control switch for the electric drive motor that constitutes a part of the drive unit. It has heretofore been suggested that the spit-supporting spindle should contain a push-rod arranged to be shifted endwise by insertion of a spit, to operate a motor-control switch mounted at the rear of the unit, to turn the motor on automatically. It is intended that the motor should automatically be turned off when the spit is removed. A spring is arranged to bias the push-rod in the direction of spit-withdrawal, to allow the switch to open and thereby to be in condition to be actuated again, the next time a spit is inserted. In the known device the push-rod is arranged to move toward the switch actuator, supported in line with the spit and with the spit-driving spindle. Such an arrangement involves unnecessary bulk.

In the illustrative embodiment below it will be seen that the motor-controlling switch is disposed to one side of the spit-driving spindle, thereby resulting in a much smaller over-all depth of the drive unit; and the push-rod is eliminated entirely. This latter change precludes the possibility of the push-rod becoming jammed, with the switch held "on."

The nature of the invention in its various aspects will be more fully appreciated from the following detailed disclosure of the illustrative embodiment, which is shown in the accompanying drawings. In those drawings.

Figure 1:
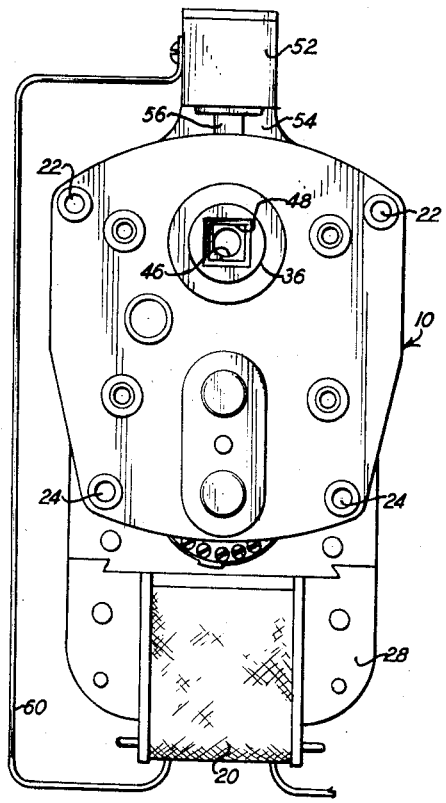
Fig. 1 is an end view of the novel spit-driving unit, viewed from the end thereof at which the spit is to be inserted.

Referring now to the drawings, a pair of castings 10 and 12 form frame-plates between which a reduction gear train 13, 14, 15, 16, 17 and 18 is supported. Pinion 13 is on the rotor 19 of electric motor 20, gear 14 and pinion 15 are united, gear 16 and pinion 17 are united, and gear 18 is on the spit-driving spindle.

Frame plates 10 and 12 are joined to each other by rivets 22 and 24, the latter passing through tubular bosses 26 that bear against the magnetic pole structure 28 of the electric motor, rivets 24 extending through the bosses 26 and the pole structure. The rivets 22 similarly extend through conventional bosses integral with the respective plates 10 and 12, the latter bosses (not shown) abutting each other. The spit-supporting and driving spindle generally indicated by numeral 30 includes a rotor 32 having an enlarged portion 34 and a reduced portion 36, the latter extending integrally from enlarged portion 34 and through an inset bearing 38 fixed in frame-plate 10. Enlarged portion 34 has a bore 40 which receives shaft 42. The latter has an external splined surface 44 which is forced into gear 18 and into bore 40, to constitute a rigid permanent assembled unit. This unit is formed prior to assembly of the spindle 30 into the drive unit.

Figure 2:
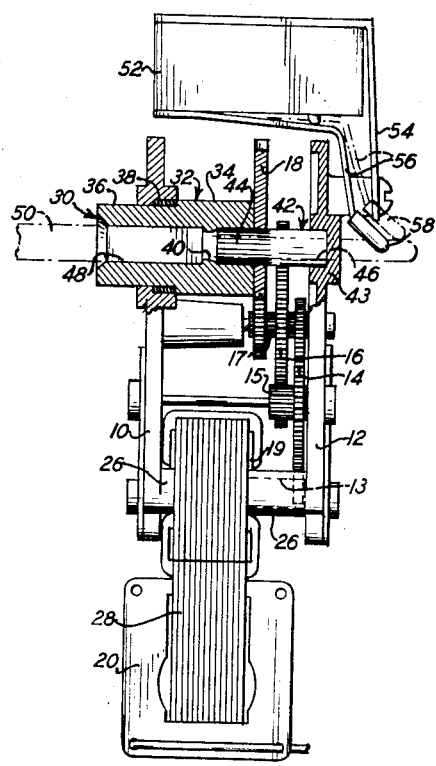
Fig. 2 is a side view, partly in cross-section, of the unit of Fig. 1, showing a switch operating lever in dotted lines in the position it assumes when operated by an inserted spit that is also shown in dotted lines.
Figure 3:
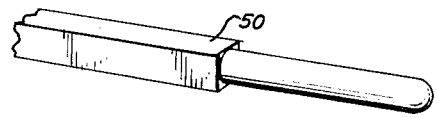
Fig. 3 is a perspective view of the portion of the spit that coacts with the drive unit in Figure 2.

The left-hand end of enlarged portion 34 (as viewed in Fig. 2) constitutes a shoulder which provides for thrust against bearing 38; and the right-hand end of shaft 42 bears against a portion 43 of the frame plate 12. Shaft 42 has a tubular passage 46 that extends from the passage 48 of square cross-section that is formed in rotor 32. A spit 50 represented in dotted lines in Figure 2 can be inserted with the square portion thereof in passage 48, in drive relation with the drive spindle 18—32—42.

A cylindrical extension of spindle 50 projects through bore 46 in shaft 42 and to the right of the rear frame-plate 12 of the unit. The diameter of bore 46 is ample for the cylindrical end portion, with some clearance allowed, so that the weight of the spit is supported by the rotor 32. A suitable snap-switch 52 is mounted laterally of spindle 30 on a bracket 52 secured to frame-plate 12. This switch has an operating lever 56 bearing a plastic enlargement or head 58, which is spring-biased so that it normally assumes the solid-line position shown in the drawings. However, when spit 50 is inserted, the right-hand end of the spit engages the enlarged portion 58 and shifts that portion to the dotted line position shown, thereby closing switch 52.

The weight of the spit in passage 48 is carried by rotor 32. The mechanical load is transmitted directly to the left-hand frame-plate 10 in Fig. 2. Spindle 30 is confined against endwise shifting by the thrust-bearing engagement of the described portions of rotor 32 and shaft 42 against the frame plates.

Switch 52, which is connected by wire 60 to motor 20, is disposed laterally of the spindle 30. In this way the space requirements of the switch and reduction geared motor assembly are held to a minimum. The switch is operated by an inserted spit, the switch arm being shifted laterally of the axis of the inserted spit 50. Provided that the spit is inserted far enough, there is no critical relationship between the extent of insertion of the spit and the switch operator 58, which would be true if the switch were disposed in line with the inserted spit.

Variations and varied application of the invention represented by the foregoing preferred embodiment will occur to those skilled in the art, so that the invention should be broadly construed, consistent with its full spirit and scope.

What is claimed is:

1. A spit-drive unit, including a spit driving and supporting spindle, a motor, a reduction gear train from said motor to said spindle, a pair of confronting frame plates fastened in spaced-apart relation to each other, said motor and said gear train being supported by and between said frame plates, said spit-driving spindle having a large-diameter portion between said plates disposed to provide endwise bearing against one of said frame plates and a reduced-diameter portion extending from said large-diameter portion through and beyond said one of said plates and having bearing support therein, said spindle having a spit-receiving passage of polygonal cross-section extending through the plane of said one frame plate and the portion of said spindle extending beyond said one of said plates being of no greater size, transversely, than the portion of the spindle that extends through said one of said frame plates.

2. A spit drive unit, including a spit driving and supporting spindle, a motor, a reduction gear train from said motor to said spindle, a pair of confronting frame plates fastened in spaced-apart relation to each other, said motor and said gear train being supported by and between said frame plates, said spit-driving spindle having a large-diameter portion between said plates and a reduced-diameter portion extending from said large-diameter portion through and having bearing support in one of said plates, said spindle having a spit-receiving passage of polygonal cross-section extending through the plane of said one frame plate, said large-diameter portion and the opposite end of said spindle engaging said frame plates, respectively, and being restrained thereby against endwise movement.

3. A spit drive unit, including a spit driving and supporting spindle, a motor, a reduction gear train from said motor to said spindle, a pair of confronting frame plates fastened in spaced-apart relation to each other, said motor and said gear train being supported by and between said frame plates, said spit-driving spindle having a rotor including a large-diameter portion between said plates and a reduced-diameter portion extending from said large-diameter portion through and having bearing support in one of said plates, said reduced-diameter portion of said rotor having a spit-receiving passage of polygonal cross-section extending through the plane of said one frame plate, a driving gear forming part of said gear train, and a shaft having an externally splined portion received in a drive fit in openings in the gear and the rotor and thereby being united thereto.

4. A spit drive unit, including a spit driving and supporting spindle, a motor, a reduction gear train from said motor to said spindle, a pair of confronting frame plates fastened in spaced-apart relation to each other, said motor and said gear train being supported by and between said frame plates, said spit-driving spindle having a large-diameter portion between said plates and a reduced-diameter portion extending from said large-diameter portion through and having bearing support in one of said plates, said spindle having a spit-receiving passage of polygonal cross-section extending through the plane of said one frame plate, said spindle being hollow to afford a through passage for a portion of an inserted spit, and a switch mounted on said unit and connected to said motor, and having a portion to be actuated directly by said spit, said switch being mounted laterally of said spindle and having an elongated actuating portion disposed slantwise along the spindle axis and swingable along a path coplanar with said spindle axis, said actuator being arranged to be deflected laterally by said spindle.

5. A spit drive unit, for a spit having a non-round portion spaced from one end thereof and having an end portion of round cross-section adjoining the non-round portion thereof, said drive unit including a driving and supporting spindle, an electric motor geared to said spindle, said spindle having a through axial passage for receiving a spit, said passage including a non-round portion to establish drive coupling to said spindle, and a switch connected in series with said motor and having an elongated actuator disposed slantwise along a path coplanar with the spindle axis, said actuator being normally disposed in the path of insertion of said end portion of the spit and supported for lateral displacement thereby.

6. A drive unit for a spit or the like, including an electric motor, a drive spindle, and a reduction gear train from said motor to said drive spindle, a confronting pair of frame plates fastened in spaced-apart relation to each other and supporting said motor and providing endwise confining and lateral supporting bearings for said gear train and for said spindle, one end of said drive spindle having endwise and lateral bearing support at one of said frame plates, the opposite end of said drive spindle having an elongated portion extending through and beyond a lateral support bearing in the other of said frame plates, and said spindle having an enlarged portion between said frame plates, one end of said enlarged portion being disposed to bear against said other frame plate at the lateral support bearing of said elongated portion therein, said elongated portion being externally no larger where it extends beyond said other of said frame plates than where it extends therethrough, and said elongated portion having a spit driving receptacle therein, said elongated portion extending integrally through said other of said frame plates.

7. A drive unit for a spit or the like, including a drive spindle, an electric motor, and a reduction gear train from said motor to said spindle, first and second confronting frame plates fastened in spaced-apart relation to each other and providing support therebetween for said motor and said gear train, both of said frame plates containing lateral support bearings for said gear train, both of said frame plates containing lateral support bearings for said drive spindle, one end portion of said spindle extending through and beyond a lateral support bearing in said first frame plate, said spindle also having a portion of larger diameter than said extending portion disposed between said confronting frame plates, said larger diameter portion of the spindle and the end of said spindle opposite said extending portion having endwise bearing restraint between said frame plates, said extending portion being of effectively uniform diameter along its length and having a spit driving receptacle therein extending within said lateral support bearing in said first frame plate.

8. In combination, a spit for a broiler or the like and a drive unit for the spit, said drive unit including an electric motor, a drive spindle, and a reduction gear train from said motor to said drive spindle, a confronting pair of frame plates fastened in mutually spaced-apart relation to each other and supporting said motor, and providing endwise confining and lateral supporting bearings for said gear train and for said spindle, one end of said drive spindle having endwise and lateral bearing support at one of said frame plates, the opposite end of said drive spindle having an elongated portion extending through and beyond a lateral support bearing in the other of said frame plates, and said drive spindle having an enlarged portion between said frame plates, one end of said enlarged portion being disposed to bear against said other of said frame plates at the lateral support bearing of said elongated portion therein, said elongated portion being no larger externally where it extends beyond said other of said frame plates than where it extends therethrough, said elongated portion having a spit driving receptacle therein extending within said lateral support bearing in said other of said frame plates, and said spit extending into said receptacle in coupled drive relation thereto, said spit extending through said plane of said other of said frame plates, and being effective thereby to transfer weight directly, from the spit through the spindle radially to said other of said frame plates.

9. In combination, a spit and a spit drive unit, said spit having a non-round portion spaced from one end thereof and an end portion of round cross-section adjoining the non-round portion, said drive unit including a spit driving and supporting spindle, an electric motor geared to said spindle, said spindle having a through axial passage for receiving the spit, said passage including a non-round portion to establish drive coupling to said non-round portion of said spit, and a switch connected in series with said motor and having an elongated actuator disposed slantwise along a path coplanar with the spindle axis, said actuator being normally disposed in the path of insertion of said end portion of the spit and supported for lateral displacement thereby.

References Cited in the file of this patent

UNITED STATES PATENTS

| | | |
|---|---|---|
| 2,754,401 | Edelman | July 10, 1956 |
| 2,821,903 | Allen et al. | Feb. 4, 1958 |
| 2,821,905 | Culligan | Feb. 4, 1958 |
| 2,822,781 | Burton | Feb. 11, 1958 |
| 2,868,469 | Sullivan | Jan. 13, 1959 |